March 21, 1967 A. KOLIN ET AL 3,309,924
ELECTROMAGNETIC FLOW METER
Filed June 22, 1964 2 Sheets-Sheet 2
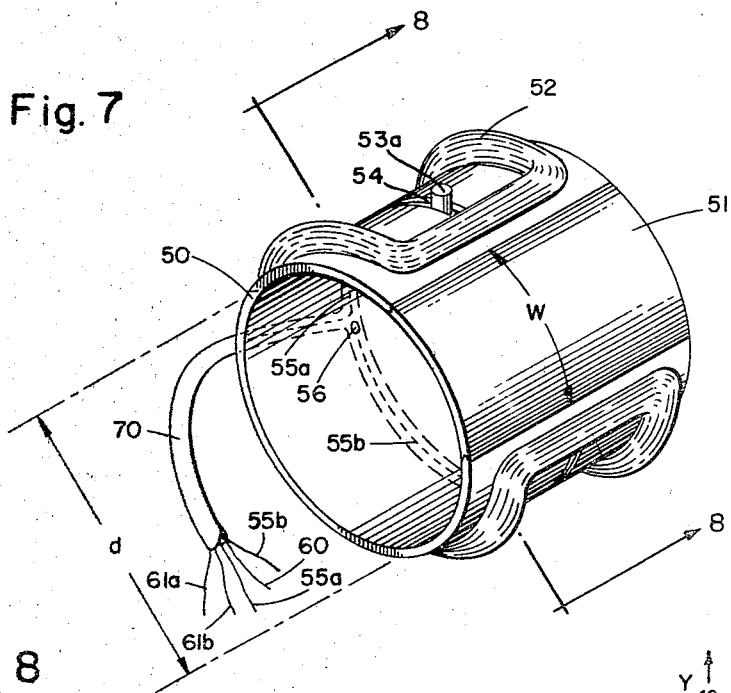
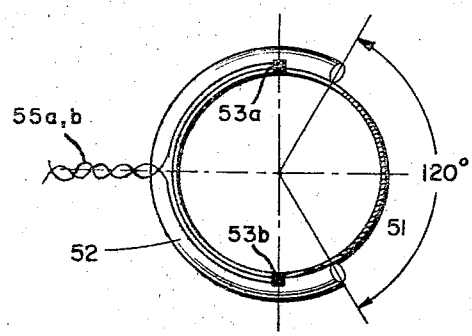
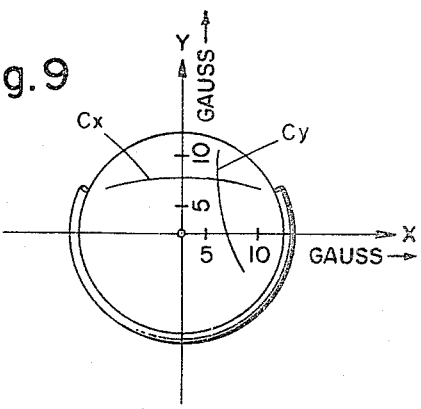
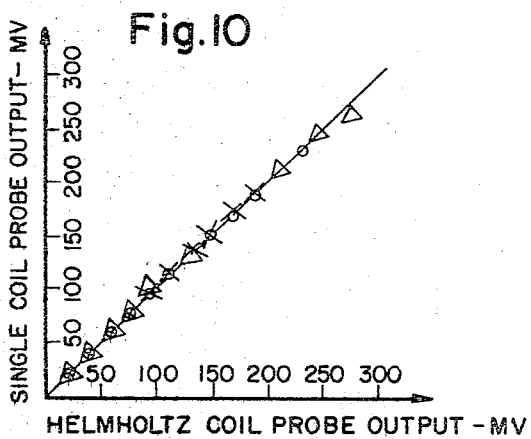

United States Patent Office 3,309,924
Patented Mar. 21, 1967

3,309,924
ELECTROMAGNETIC FLOW METER
Alexander Kolin and Roger Wisshaupt, Los Angeles, Calif., assignors to The Regents of The University of California, a corporation of California
Filed June 22, 1964, Ser. No. 376,906
11 Claims. (Cl. 73—194)

This invention relates to flow metering devices and more particularly to miniature electromagnetic flow sensors designed for implanting in living creatures for monitoring the rate of flow of blood through particular vessels of the vascular system.

There is an ever-growing interest in the determination of the rate of blood flow through unopened blood vessels in conscious mammals. This interest extends beyond the interest in hemodynamics and offers potentialities in providing a general index to the activity of a variety of organs of the body. For example, the rate of blood supply to an organ is the determining factor in the regulation of the supply of oxygen, hormones and nutrient materials as well as determining the rate of removal of metabolic products. The blood flow through an undisturbed organ, when correlated with its rate of activity, could thus be used to follow variations in the organ's activity in response to a variety of stimuli and inhibiting factors.

It was discovered a number of years ago by the inventor, Dr. A. Kolin, that the continuous recording of blood flow through blood vessels can be accomplished by the measurement of the electromotive force induced in the blood flowing transverse to an electromagnetic field. In the case of a circular conduit, similar to an artery, and axially symmetrical flow, the induced E.M.F. is a linear function of the average fluid discharge. In the case where the conduit is itself conductive, it is possible, particularly in the case of blood vessels, to detect flow signals by establishing electrical contact with two points on the outside wall of the conduit, preferably at opposite ends of a diameter perpendicular to the magnetic field.

Employing this principle, a number of flow meters based upon Dr. Kolin's teaching have been designed for extra-corporeal or implanted measurement of blood flow. Basically, these flow meters include a plastic body having a cylindrical opening or lumen corresponding in size to the outside diameter of a blood vessel to be monitored. The sleeve is normally slotted or hinged to allow the insertion of the vessel into the lumen. The sleeve normally carries a pair of metal electrodes (e.g. platinized platinum) embedded in the plastic wall at diametrically opposite positions to sense the electrical potential developed across the vessel by fluid flow in the presence of a transverse magnetic field. This field can be produced between a pair of iron pole pieces embedded in the plastic body and defining an airgap across the blood vessel in an otherwise closed magnetic circuit. This type of flow sensor is known as the core type and is particularly useful in measurement of flow in small blood vessels. The magnetic core flow sensor provides a high sensitivity because of the relatively high magnetic field strength obtained but has the disadvantage of great bulk occupied by the iron, in addition to the space filled by copper and encasing plastic material. The magnetic field distribution of the core type sensor is not perfectly uniform; however, complete field homogeneity has been shown to be unnecessary to provide an adequate precision in monitoring blood flow.

Where a precise reference flow meter is required, a Helmholtz coil flow meter is used. It employs no magnetic core, instead has a pair of large air core coils aligned on a common axis extending on a transverse diameter of the vessel. The magnetic field thus produced is uniform across the vessel; however, the bulk of these flow meters is so great that they are not very desirable for implanting and are best suited for use mainly as extracorporeal reference devices for calibration of other types of flow meters.

To date the most practical implantable flow meter developed prior to this presentation is the dual coil coreless transducer of the type described in the article, "Electromagnetic Blood Flow Meters," by A. Kolin, appearing in Science, vol. 130 (1959), pages 1088–1097 @ 1092. These coreless transducers employ a pair of flat coils formed into generally semicircular form and secured to the outer surface of a tubular sleeve. The sleeve is either hinged or longitudinally slotted to allow the insertion of an artery into the lumen of the sleeve.

Despite the improvements afforded by the dual coil transducer over the core type and Helmholtz coil designs, there has been a continuing need for improved electromagnetic flow probes.

It is, therefore, a general object of this invention to provide a flow probe capable of improved performance.

Another object of this invention is to provide an implantable coreless flow probe which can be used to monitor blood flow in arteries as small as 2.5 mm. in diameter.

Still another object of this invention is to produce a flow meter of minimum size, simplified construction, and easily reproduceable.

These objects are all achieved an a flow sensor comprising a tubular body of dielectric material longitudinally slotted to allow the insertion of a blood vessel or other conduit and carrying a single coil curved to extend over more than half of the periphery of the body to generate a magnetic field in the lumen region. A pair of electrodes diametrically positioned extend through the body to make electrical contact with the exterior of a vessel or conduit passing through the sensor. The electrode axis is preferably perpendicular to the plane of symmetry passing through the flow axis.

One feature of this invention resides in the use of a single coil for producing the magnetic field in a coreless electromagnetic flow sensor.

Another feature of this invention resides in the arrangement by which the single coil is formed about the major area of the body while providing a shutter opening in the order of one-half of the lumen diameter.

Still another feature of the invention resides in the arrangement of a permanently fixed single coil and electrode assembly in a compact device which provides a large shutter opening.

These and other features of this invention may be more clearly understood from the following detailed description and by reference to the drawing in which:

FIG. 7 is a perspective showing of the single coil flow sensor of this invention;

FIG. 8 is a simplified sectional view of the flow sensor of FIG. 7 taken along lines 8—8 of FIG. 7;

FIG. 9 is a simplified representation of the sensor of FIGS. 7 and 8 showing field distribution curves C$x$ and C$y$ thereon; and FIG. 10 is a graphical showing of the voltage output of the single coil sensor of FIG. 7 as compared with the reference Helmholtz flow sensor of FIG. 3.

Figure 1:
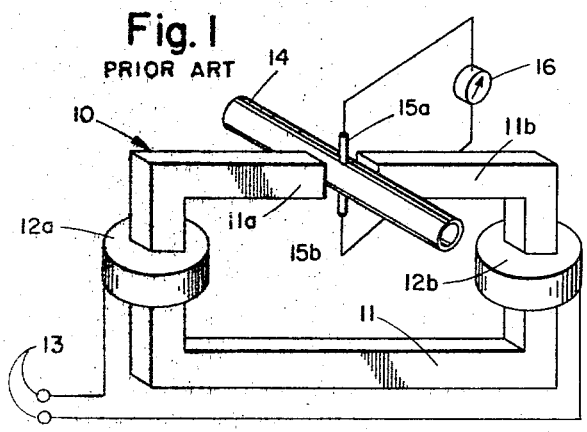
FIG. 1 is a simplified schematic representation of a core type electromagnetic flow sensor.

Now, refering to FIG. 1, the principles of operation of the electromagnetic flow meter are easily illustrated by the structure shown therein. A magnetic core flow sensor, generally designated 10, is shown therein including a magnetic core structure 11 having a pair of pole pieces 11$a$ and 11$b$ and surrounded by a pair of coils 12$a$ and 12$b$ connected in series to a pair of terminals 13. A fairly uniform magnetic field is produced in the airgap between the pole pieces 11$a$ and 11$b$ when a uniform current is passed through the coils, wound in series aiding relationship, on the core 11. When a conduit 14, in the usual case a surgically exposed but intact blood vessel, extends across the airgap and carries a conductive fluid such as blood, an electrical potential is induced orthogonally with respect to the direction of the magnetic field and the direction of flow.

The induced electromotive force is detected by a pair of diametrically opposed electrodes 15$a$ and 15$b$ and displayed or recorded on an output device indicated in FIG. 1 as a meter 16.

Figure 2:
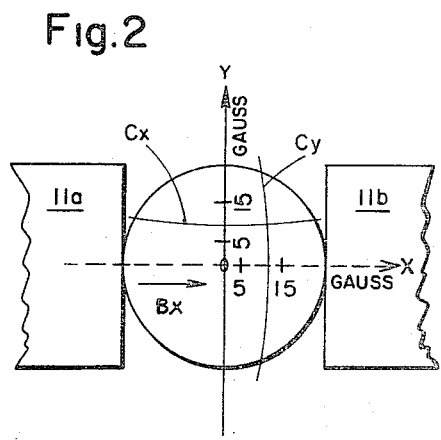
FIG. 2 is a simplified fragmentary view of the flow sensor of FIG. 1 showing the magnetic field distribution therein, with the X component of the magnetic field plotted (Hx) as percentage changes along the X axis (curve Cx) and along the Y axis (curve Cy)

The magnetic field distribution in the region of the airgap of the device of FIG. 1 is illustrated in FIG. 2 by the pair of curved lines C$x$ and C$y$:

C$x$ representing field distribution of B$x$ obtained by moving a search coil along the X axis; and C$y$ representing the field distribution B$x$ obtained by moving the search coil along the Y axis.

The curvature of the lines C$x$ and C$y$ indicate the lack of complete field homogeneity, however, this deficiency has been shown to be of little importance by comparison with the performance of a standard transducer exhibiting practically perfect field homogeneity.

Figure 3:
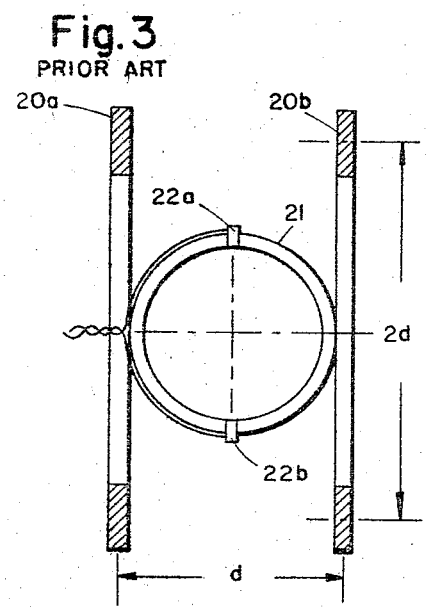
FIG. 3 is a vertical sectional view of a Helmholtz coil flow sensor.
Figure 4:
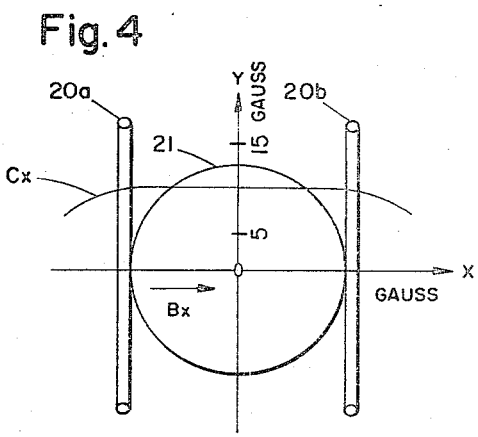
FIG. 4 is a simplified representation of the flow sensor of FIG. 3 showing the X component of the magnetic field therein.

Such a standard is the Helmholtz coil device of FIG. 3. Instead of the magnetic core and remote coils of the device of FIG. 1 the Helmholtz coil flow sensor employs a pair of air core coils 20$a$ and 20$b$, large in diameter in comparison to the sleeve 21, positioned therebetween and along their common axis. Similar to the magnetic core sensor, the Helmholtz coil flow probe includes a pair of oppositely positioned electrodes 22$a$ and 22$b$ for detecting the EMF induced across the fluid passing through the conduit 21. The limiting size of this design is indicated in the drawing by the fact that the practical minimum diameter of the coils 20$a$ and 20$b$ is approximately twice the diameter $d$ of the sleeve 21. The magnetic field distribution B$x$ of the Helmholtz coil sensor is clearly shown to be homogeneous in the intercoil region by the curve C$x$ in FIG. 6.

Figure 5:
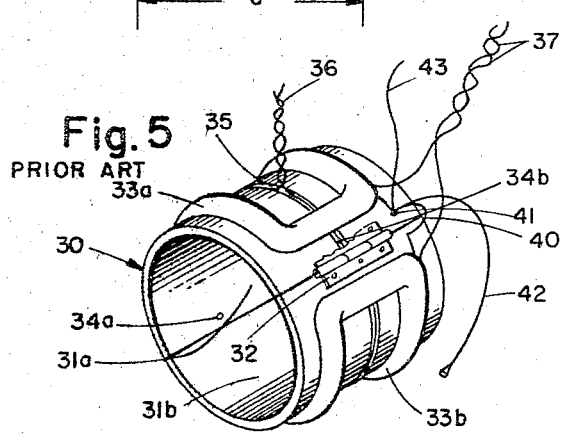
FIG. 5 is a perspective showing of a double coil hinged flow sensor.

An example of a miniaturized implantable coreless flow sensor employing two coils previously invented by A. Kolin is shown in FIGURE 5. Functionally similar to the Helmholtz coil device of FIG. 3, the coreless sensor designated generally 30 includes a longitudinally split sleeve with halves 31$a$ and 31$b$ pivotedly secured at one edge by hinge 32 and held together by a pin or other fastener at the other edge and unshown in the drawing. Each of the sleeves or shell parts 31$a$ ad 31$b$ carries on its outer surface a respective bent coil 33$a$ or 33$b$ corresponding to the planar coils 20$a$ and 20$b$ of the Helmholtz transducer of FIG. 3. Embedded in the shell 31$a$ at nearly diametrically opposite positions are a pair of electrodes 34$a$ and 34$b$ extending inwardly into the lumen of the sleeve 31 and outwardly into a peripheral groove 35 used for positioning lead wires 36 from the two electrodes 34. The two bent coils 33$a$ and 33$b$, with external lead wires 37, are connected in series by a flexible jumper 40 secured to ground terminal 41 on sleeve part 31$a$. The ground terminal 41 is connected to an external ground and to the mid-point between the coils 33$a$ and 33$b$ as well as to the body of the subject through lead 42.

The dual coil flow sensor of FIG. 5 is emplaced by surgically exposing an artery of diameter corresponding to the lumen diameter, opening the sensor 30, closing it about the artery, and securing the fastener. The grounding lead is secured to the subject and the remaining leads 36, 37 and 43, commonly enclosed in a common cable cover, are brought out through the tissue and skin for connection externally to a source of magnetizing current for the coils and a signal processing system and/or display for the output leads 36 through which the blood flow of the artery or conduit is monitored.

The coils 33$a$ and 33$b$ of the flow sensor of FIG. 5 are symmetrically positioned with respect to the conduit, similar to the Helmholtz coil sensor of FIG. 3, and the electrodes 34$a$ and 34$b$ are located substantially opposite to each other.

Figure 6:
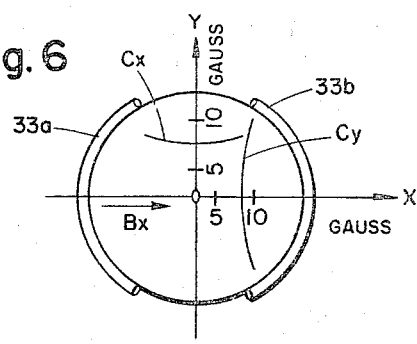
FIG. 6 is a simplified representation of the flow sensor of FIG. 5 showing the magnetic field distribution therein (curves Cx and Cy) similar to representation in FIG. 2.

The magnetic field distribution of the dual coil coreless transducer of FIG. 5 is illustrated in FIG. 6. The field distribution C$x$ along the X axis and C$y$ along the Y axis are both non-homogeneous; however, this lack of homogeneity has not degraded its performance and the compact design of the dual coil flow sensor has in the past been the most highly favored implantable flow meter. The dual bent coil transducer is also produced with a rigid sleeve having a removable sliding shutter closure to allow it to be slipped over an artery and then closed.

Notwithstanding the advantages of the dual bent coil sensor, a marked improvement in design, reproducibility and ease of installation is attained in the single coil sensor of this invention, shown in FIG. 7.

The simplified and improved structure of the single coil flow sensor is based upon the discovery that symmetry of coil design is not essential to produce magnetic field distribution within the lumen of the transducer necessary for reliable measurement. In the device of FIG. 7 the flow sensor body comprises a longitudinally segmented sleeve 50 closed by a shutter 51 having mating V-shaped protrusions and slots respectively. The sleeve supports a single coil 52 made up of, for example, 100 turns of 31-gauge insulated copper magnet wire. The length of the coil is such that it subtends an angle about the axis of the flow sensor sleeve greater than 180°. In particular, the preferred length of the coil 52 is such that the arcuate portion of the assembly between the parallel end legs of the coil subtends an angle in the order of 120° at the sleeve axis. This coil length allows the shutter width W to exceed one-half of the lumen diameter $d$ whereby an artery may be easily inserted. This is a major advantage of the design. In prior dual coil transducers using shutters, the opening is limited to approximately 60° because of the proximity of the electrodes and coil ends. The hinged dual coil sensor of FIG. 5 provides for easy insertion of arteries but involves the unwanted complexity of the hinge and fastener which are subject to wear with use. Furthermore, the hinged sensor involves relative movement of the coils in placing which may result in variations in magnetic field distribution, particularly the quadrature, from one emplacement to the next. Leakage currents through the seam of the hinged structure after repeated use can give rise to incorrect readings.

The single coil flow sensor of FIG. 7, similar to previous designs, includes a pair of diametrically oppositely positioned electrodes 53$a$ and 53$b$, which may be seen in FIG. 8, positioned in circumferential groove 54 and connected to an external signal processing system through respective leads 55$a$ and 55$b$. A grounding electrode 56 extends into the lumen to contact the conduit or artery monitored at a point on its periphery 90° displaced from the opposed electrodes 53$a$ and 53$b$. The grouding electrode is externally connected via a lead 60 while the single coil 52 terminates in leads 61$a$ and 61$b$ which, along with the remaining leads 55a and 55b and 60, are all contained within a single insulating tubing 70. Grounding may also be accomplished by external leads as in the case of the dual bent coil device of FIG. 5, or by conductive electrodes located on the sleeve 50 in any position.

The relative positions of the single coil 52, the electrodes 53a and 53b, and the shutter 51, are all more clearly shown in FIG. 8 with the aperture between the ends of the coil and the shutter 51 subtending angles of approximately 120°; and the electrodes 53a and 53b positioned within the confines of the coil 52. This is in contrast to the prior designs in which the magnetic field producing coils are symmetrically arranged with respect to the sleeve and the electrodes are placed outside of the coils.

Despite the lack of symmetry of the coil 52 of this invention, the magnetic field distribution exhibits asymmetry comparable to prior devices, as is apparent in FIG. 9. In that figure the field distribution along the X axis is relatively uniform as indicated by the curve $Cx$. A stronger field exists near the wall opposite the shutter 51 as is expected, and illustrated by the asymmetry of curve $Cy$. This asymmetry does not result in any detectable deviations in performance from the performance of the standard reference Helmholtz type probe.

A flow meter probe of the single coil type and 3 mm. lumen diameter has been tested by connection hydraulically in series with a Helmholtz coil probe of equal diameter serving as a reference standard of optimal field design. The intensities of the magnetic fields of the two probes and the amplifications of the electronic channels connected to them were adjusted so as to yield identical output signals for the maximum flow obtainable with the hydraulic system. The maximum flow values used were between 500 and 600 cc. per minute. The fluids used were human blood (195 ohm-centimeters resistivity at room temperature of 20° C.) and a saline solution adjusted to 195 ohm-centimeters resistivity. Two sets of tests were performed:

With the fluid in direct contact with the electrodes of the single bent coil sensor; and With a dog's carotid artery separating the electrodes of the same probe from the streaming fluid.

FIG. 10 shows the output of the single coil flow sensor as a function of the fluid flow as determined by the Helmholtz coil standard flow sensor. The points marked with a circle (O) denote measurements obtained using blood without an intervening artery; those marked with a cross (X) denote data obtained using blood passing through an artery; and those with a triangle (Δ) denote saline solution without an artery. The deviations from linearity in early prototype sensors are well within the limits of four-percent error. These early results clearly demonstrate that a linear flow voltage relationship may be achieved in a transducer which has an asymmetrical magnetic field structure and a nonhomogeneous magnetic field.

The construction of the flow sensor of FIG. 7 is accomplished by machining the cylindrical sleeve 50 from an epoxy resin rod with the inside diameter of the sleeve machined to be equal to the artery to be accommodated and the wall thickness preferably ¾ mm. for all sleeve sizes. The length is normally twice the inside diameter but can be varied for different implantation sites. A groove 54 is machined around the sleeve 50 deep enough to embed the electrode lead wires 55a and 55b. The electrodes 53a and 53b (platinum wires of 0.025 in. diameter for units below 6 mm. inside diameter, and 0.04 in. diameter for larger units) are soldered to the ends of lead wires 55a and 55b respectively (Teflon-covered tinned stranded copper wire AWG 34), composed of seven strands of number 42 wire as manufactured by the Tensolite Wire Company. Three holes into which the electrodes 53a and 53b fit snugly are drilled exactly 90° apart. In certain cases the ground electrode 56 is eliminated simplifying the sensor construction. In such cases a separate ground lead is provided to ground the subject, preferably by a good metallic contact, to muscle tissue as close to the implanted sensor as possible.

The lead wires 55a and 55b are run through the groove 54 from the electrodes to meet midway, are twisted and passed through a grounded flexible shield, for example "Alpha braid No. 1332." The coil leads 61a and 61b are passed along the shielded electrode leads 55a and 55b through a polyvinyl chloride tubing 70 which is sealed by a small amount of cement.

During the last manufacturing steps, the sleeve 50, near ground terminal 56, is coated with a plastic material in which the outer surfaces of the assembly are subsequently potted to complete the assembly.

The coil 51 consists, in one embodiment, of 100 turns of gauge 31 "Formvar" insulated magnetic wire. It is wound on a planar form and subsequently bent to conform to the shape of the sleeve 50 after being laced with thread spiraling around the coil-turns to prevent them from spreading apart. It is dimensioned so that the coil edges parallel to the shutter 51 subtend an angle of approximately 120° at the cylinder axis of the sleeve. The 120° angle produces a magnetic field within the lumen which is of optimum uniformity but variations therefrom are possible, limited at one extreme by the minimum practical shutter size and 180° which leaves a substantial region of the lumen virtually out of the magnetic field of the coil. The minimum coil subtending angle therefore exceeds 180°.

The terminals of the coil wire meet at the center of the long edge of the coil 51 and are bent toward the central groove 54. The lead wires 61a and 61b are soldered to them, twisted and passed through the polyvinyl chloride tube 70. The coil is fixed in place by epoxy cement, for example "Hysol No. 2038," which is heated by passing 300 milliamperes through the coil after positioning it with respect to the electrodes 53a and 53b so as to minimize the quadrature EMF induced in the electrode circuit when the sleeve is filled with a conductive fluid. This is accomplished by mounting the assembly with the longitudinal axis vertical and filling the interior with mercury. The length of the sleeve 50 may be extended by mating tube extensions so that the mercury extends at least one-lumen diameter above and below the edges of the sleeve 50. Current is passed through the coils while the electrodes are connected to the blood flow amplifier system used in normal operation and adjusted so as to sense optimally the quadrature voltage. This voltage is reduced to a minimum by shifting the coil angularly relative to the electrodes after which the coils are fixed in position as described above.

Next, the sleeve 50 is longitudinally slit just beyond the straight ends of the coil to produce the shutter 51. This section of approximately 120° angular length is removed and edge grooved, coated with a suitable mold release coating, and returned to position in the sleeve. The sleeve and shutter with the coil in place are then inserted in a preheated aluminum mold which is slowly filled with preheated liquid epoxy casting resin. After about one-hour in an oven raised to 140° the sensor is ready except for cleaning the electrode surfaces by filing and platinizing them. After removal from the mold, the electrodes are filed flush with the wall of the sleeve for subsequent platinizing.

The grooved shutter acts, in the molding step, as the mold for its own sliding bed, the pointed projection formed on the edges of the sleeve 50 in the molding step. The shutter may thereafter be inserted in the finished flow probe either by sliding in or, which is more convenient during surgery, by pressing it in radially which makes it snap in place. To facilitate removal the shutter may include a thread or other suitable handle.

The last operation in the flow probe manufacture consists of platinizing the electrodes. Platinization of electrodes is well known as a means of minimizing polarization effects. The procedure used is that described by G.

Jones and D. M. Bollinger in "The Measurement of the Conductance of Electrodes VII on Platinization," J. Am. Chem. Soc., vol. 57, p. 280; 1935. After platinization according to this procedure the electrode surfaces are slightly raised, projecting into the flow probe lumen insuring good contact with the fluid medium, artery or other conduit passing through the lumen.

The power supply for the coil and preferred signal processing apparatus for use with this flow probe is described in the article "A Low-Cost Portable Electromagnetic Blood-Flow Meter System Utilizing Commercially Available Devices," David P. Ryan, appearing in the Institute of Electrical and Electronic Engineers, Transactions on Bio-Medical Electronics, vol. BME–10, No. 2, published July 2, 1963. Further details of the single coil flow sensor of this invention may be found in the article following the above in the same publication, namely A. Kolin and R. Wisshaupt, "Single-Coil Coreless Electromagnetic Blood-Flow Meter," appearing on pages 60 et seq.

It is to be fully understood that the embodiments described and shown herein are merely illustrative of the principles of this invention and the scope of the monopoly granted hereunder is not limited thereto but rather to the structures defined by the claims appended hereto and their equivalents under the patent laws of the United States of America.

What is claimed is:

1. A flow sensor comprising:
   a body member having a fluid passage therethrough;
   a single air core coil positioned on and partially encircling said body in position to produce an electromagnetic field of substantially uniform field strength in the fluid passage in said body; and
   a pair of electrodes positioned to sense the electromotive force developed in a conductive fluid passing through the fluid passage.

2. A flow sensor comprising:
   a tubular body member including a lumen;
   a single air core coil including a number of turns of insulated wire formed about a portion of the periphery of the tubular body member;
   a pair of electrodes positioned to sense electromotive force developed in a conductive fluid passing through the lumen of said body member; and
   said tubular body member of unitary relatively rigid form except for a longitudinal portion outside of the coil which is openable to allow the insertion of a fluid conduit into the interior of the flow sensor.

3. A flow sensor for monitoring the flow of blood or other electrically conductive fluid through a blood vessel or deformable conduit comprising:
   a tubular dielectric support member having an aperture therethrough of transverse dimension and shape corresponding to the blood vessel or conduit to be monitored;
   a pair of electrodes penetrating the support member at spaced positions;
   lead means connected to respective electrodes;
   a single coil comprising a number of turns of insulated wire;
   said coil formed to conform with the external surface of the support member and positioned thereon so as to generate a magnetic field in the lumen having a component transverse to the fluid flow;
   said coil including portions extending over greater than half of the circumferential length of the support member;
   said support member longitudinally segmented in the peripheral region outside of the coil to constitute an openable portion for insertion of a deformable fluid conduit into the aperture; and
   lead means for said coil to conduct current to the coil to generate the magnetic field.

4. A flow sensor comprising a tubular body of dielectric material having a lumen extending therethrough and a relatively slight wall thickness;
   a pair of electrodes extending through said wall in substantially opposed positions so as to make electrical contact with opposite sides of the medium within the lumen;
   a coil comprising a number of turns of an insulated electrical conductor overlying the tubular body with a pair of curvalinear sides extending transversely around the tubular body greater than half of the peripheral distance thereof;
   lead means for introducing magnetizing electrical current into said coil;
   lead means for conducting potential differences detected across the lumen by the electrodes; and
   means for selectively opening and closing the tubular body in the peripheral longitudinally extending region beyond the coil to allow the insertion of a fluid conduit to be sensed.

5. The combination in accordance with claim 4 wherein said coil subtends an angle about the axis of said tubular member in the order of 240°.

6. The combination in accordance with claim 4 wherein said opening means comprises a removable segment of said tubular body.

7. The combination in accordance with claim 6 wherein said removable segment subtends an angle at the axis of said body in the order of 120°.

8. A flow sensor for monitoring the flow of conductive fluid through a conduit comprising:
   a coil including a number of turns of insulated electrical conductor for producing a magnetic field;
   said coil including a pair of circular arcuate portions subtending an angle at the center thereof greater than 180° and including a pair of connecting legs forming the continuation of the ends of said arcuate portions;
   a pair of electrodes for sensing the electromotive force induced in the fluid resulting from fluid flow;
   lead means for said magnetic field producing coil; and
   lead means for detecting potential differences across said electrodes upon the passage of a conductive fluid through said coil in the presence of a magnetic field produced by said coil.

9. The combination in accordance with claim 8 wherein said coil subtends an angle at the axis thereof in the order of 240°.

10. A flow sensor comprising:
    a body member having a fluid passage therethrough;
    a single coil positioned on said body in position to produce an electromagnetic field in the fluid passage in said body, the axis of symmetry of said magnetic field passing transversely through said passage; said member having an opening communicating between the exterior of said member and the full length of said passage; said axis passing through said opening; and
    a pair of electrodes positioned to sense the electromotive force developed in a conductive fluid passing through the fluid passage; said electromagnetic field being substantially unidirectional in a plane perpendicular to the direction of said fluid passage and passing through said electrodes.

11. A flow sensor comprising:
    a tubular body member including a lumen;
    a single coil including a number of turns of insulated wire formed about a portion of the periphery of the tubular body member; said coil producing an electromagnetic field, the axis of symmetry of which passes transversely through said lumen;
    a pair of electrodes positioned to sense electromotive force developed in a conductive fluid passing through the lumen of said body member; said magnetic field being substantially unidirectional in a plane perpendicular to said lumen and passing through said electrodes; and said tubular body member including a longitudinal portion outside of the coil openable to allow the insertion of a fluid conduit into the interior of the flow sensor, said axis passing through said longitudinal portion.

References Cited by the Examiner

UNITED STATES PATENTS 3,108,474  10/1963  Jun-Ichi Sasaki et al. ___ 73—194

OTHER REFERENCES

"Electromagnetic Blood Flow Meters," A. Kolin, Science, vol. 130, October 1959, pages 1088–1097.

JAMES J. GILL, *Acting Primary Examiner.*

RICHARD C. QUEISSER, *Examiner.*

C. A. RUEHL, *Assistant Examiner.*